April 8, 1952        T. T. MacLEAN        2,591,953
FACE MASK FOR PROTECTION AGAINST DUST AND THE LIKE
Filed March 23, 1949
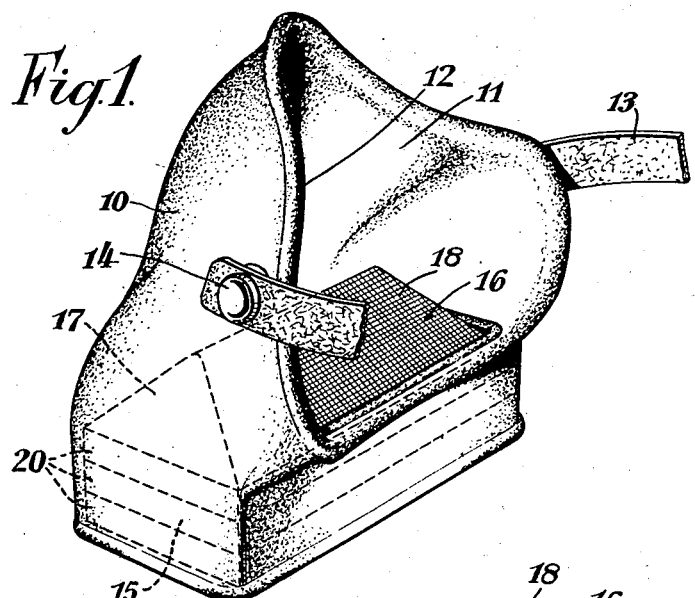
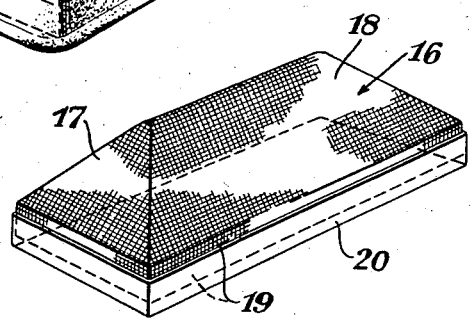
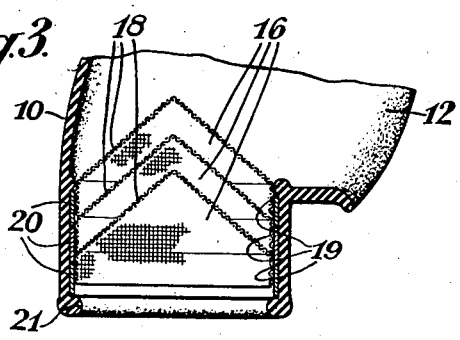
Inventor:
Thomas Traill MacLean
Attorneys:

UNITED STATES PATENT OFFICE 2,591,953

FACE MASK FOR PROTECTION AGAINST DUST AND THE LIKE

Thomas Traill MacLean, London, England, assignor to Anglo-Iranian Oil Company Limited, London, England, a British joint-stock corporation Application March 23, 1949, Serial No. 82,933
In Great Britain April 16, 1948

4 Claims. (Cl. 128—146)

The invention relates to face masks for protection against dust and other finely divided solid particles suspended in the air.

The invention has among its objects to provide a form of dust mask which obviates the need for valves. It is another object of the invention to provide a mask that is easy and comfortable to wear and that offers no obstruction to the sight. Yet another object of the invention is to provide a mask wherein the efficiency of the filtering effect of the mask may be varied to adapt the mask for use in atmospheres having varying dust contents and in which the filter elements may easily be removed for cleaning, and if necessary, replacement. It is still another object of the invention to provide a mask having filter elements that can be easily cleaned and sterilised.

According to the invention, a face-mask for protection against dust or other finely divided solid particles, comprises a face-piece adapted to cover the nose and mouth and formed at its lowermost point with an aperture in which is located a perforated screen inclined to the general direction in which air passes into the mask, whereby when air having solid particles suspended therein is drawn into the mask by inhalation, the solid particles are held back by the screen, the process being assisted by the wetting action of the exhaled air which also prevents an undue accumulation of particles on the screen.

The screen is advantageously of inverted V-section and a number of such V-section screens may be nested one within the other so that air drawn through them will change direction a number of times thereby causing solid particles to lose velocity and to settle out on or adhere to the screens. The number of screens used regulates the degree of filtering achieved.

The inverted V-section screens may advantageously be formed with a lower portion with parallel sides around which is secured a bead or band, whereby the screens may be nested one within the other with the beads or bands in contact and with the inverted V-section portions of the screens spaced away from each other.

The screens are advantageously made of metal gauze since such screens can be readily removed and cleaned, but they may also be made of finer mesh material, such as fabric, where finer particles of dust require to be removed from the air stream.

One embodiment of the invention will now be described by way of example with reference to the accompanying drawings wherein:

Figure 1 is a perspective view of the complete mask,

Figure 2 is a perspective view of a filter screen for use in the mask, and

Figure 3 is a cross-section through the lower portion of the mask showing the arrangement of the screens therein.

The mask comprises a face-piece 10 which is formed with an upper opening 11 shaped to make a close fit around the nose and mouth, a bead or rim 12 being conveniently formed around said opening. The face-piece may be made of any suitable material but is conveniently made of soft rubber. A strap 13 is secured to the face-piece for supporting the mask from the head, said strap being permanently secured at one end to the face-piece and being detachably secured thereto at the other end by means of any suitable releasable fastening such as a press stud fastener 14.

The lower portion 15 of the face-piece is formed to a rectangular section to accommodate a number of filter screens 16 one of which is illustrated in Figure 2. The screens are formed of any suitable perforate material, such as metal gauze, and as shown are in the form of triangular prisms having an open base, inwardly sloping ends 17 and quadrilateral sides 18. The screens are formed with a parallel-sided lower portion 19 around which is secured a metallic band 20. Said bands provide a convenient means of positioning and spacing the filter screens from each other when they are nested one within the other, as shown more particularly in Figure 3. It will be understood that the bands 20 need not extend completely around the screens to perform their spacing function but it is convenient that they should do so since the strength and rigidity of the screen is thereby increased. The dimensions of the face-piece and of the screens are such that the rectangular section portion 15 of the face-piece requires to be distended in order to insert the screens therein whereby the screens are firmly held in position. The portion 15 of the face-piece may be formed with an inwardly directed bead 21 around its lower edge in order to position and retain the filter screens.

When air is inhaled through the screen assembly, it is caused to scrub the surface of the screens due to the inclination of their surfaces to the air stream and to change direction before passing through the screens. Any solid particles in the air stream will be caused to lose velocity and will settle out on or adhere to the screens. The majority of particles adhere to the under surfaces of the screens and the exhalation of moist air will remove sufficient of the adhering particles to prevent such heavy accumulation as would restrict breathing.

It will be understood that both inhalation and exhalation take place through the screen assembly, no separate exhalation valve being provided.

I claim:

1. A face mask for protection against dust or other finely divided solid particles, which comprises a face-piece adapted to cover the nose and mouth and formed at its lowermost point with an aperture in which are located a plurality of inverted V-section screens nested one within the other, said screens being in the form of triangular prisms having an open base and inwardly sloping ends, whereby when air having solid particles suspended therein is drawn into the mask by inhalation, said solid particles are held back by said screens.

2. A face mask according to claim 1, wherein said screens are formed with a lower portion with opposed pairs of parallel sides around which is secured a band, whereby the screens are nested one within the other with the bands superimposed and in contact and with the inverted V-section portions of the screens spaced away from and parallel with each other.

3. A face mask according to claim 2 wherein said face-piece is formed with a lower portion of rectangular section to accommodate the parallel-sided portions of the screens.

4. A face mask according to claim 3 wherein said portion of rectangular section is formed with an inwardly directed locating and retaining bead around its lower edge.

THOMAS TRAILL MacLEAN.

REFERENCES CITED

The following references are of record in the file of this patent:

UNITED STATES PATENTS

| Number | Name | Date |
| --- | --- | --- |
| 604,598 | Boswell | May 24, 1898 |
| 881,483 | Olsen | Mar. 10, 1908 |
| 1,142,990 | Stern | June 15, 1915 |
| 1,410,928 | Knoblock | Mar. 28, 1922 |
| 2,068,858 | Jones | Jan. 26, 1937 |
| 2,220,374 | Lewis | Nov. 5, 1940 |